Feb. 20, 1934.                 A. HOLLANDER                1,947,909
                                TOOL JOINT
                              Filed May 12, 1930
Fig. 1.                       Fig. 2.
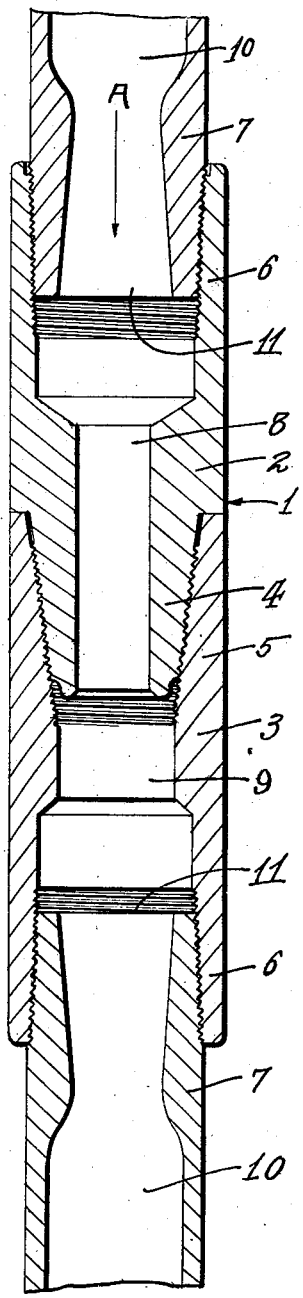 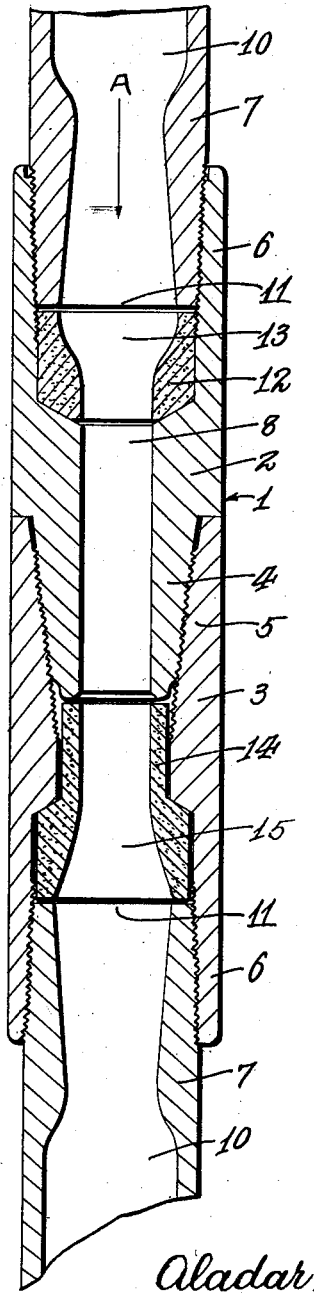
Inventor
Aladar Hollander
By Lyon & Lyon
Attorneys Patented Feb. 20, 1934

1,947,909

UNITED STATES PATENT OFFICE 1,947,909

TOOL JOINT

Aladar Hollander, Pasadena, Calif., assignor to Byron Jackson Co., San Francisco, Calif., a corporation of Delaware Application May 12, 1930. Serial No. 451,639

10 Claims. (Cl. 285—146)

This invention relates to an improvement in tool joints such as are used in connection with drill pipe for well drilling and my improvement relates more specifically to the design of the fluid passage through such a tool joint. In tool joints of the usual design the fluid passage has a number of abrupt changes in cross sectional area. For example, the threaded bore which receives the threaded end of the drill pipe is of substantially greater cross sectional area than the discharge end of the drill pipe. Also, the passage through the pin member of the tool joint is considerably smaller in diameter than either the discharge end of the drill pipe or the threaded section of the tool joint. These abrupt changes in area cause a turbulent flow of the circulating fluid.

Turbulence is the result of innumerable eddy currents which wear away or erode the tool joint. The wearing away or eroding gradually weakens the tool joint thus materially shortening its life and may even cause the tool joint to fracture, which fracture may cause extensive damage to the drilling equipment and possible loss of life of the drilling crew.

A further disadvantage of turbulence caused by the abrupt change in section of the fluid passage is the loss in head or pressure of the circulating fluid forced through the tool joints. The pressure loss may be small for each tool joint but in drilling strings where many hundred tool joints are used, the pressure loss is a large and important factor, for the reason that efficient drilling requires that a large volume of high pressure circulating fluid be delivered to the cutting tool to wash the deleterious material from the well. With my improved and more efficient form of tool joint less initial pressure is required to deliver the same volume of circulating fluid to the cutting tool or with the same initial pressure a greater volume of circulating fluid at a higher pressure will be delivered to the cutting tool, thus resulting in more efficient drilling.

It is therefore one of the objects of this invention to provide a tool joint having a stream line passage therethrough whereby the turbulence of the circulating fluid is reduced to a minimum, and thereby greatly reducing the loss of head or pressure of the circulating fluid forced through the tool joint passage and also greatly reducing erosion of the tool joint.

It is a further object of this invention to provide means to be associated with a standard tool joint to change the fluid passage from the abrupt changes of area to a passage having substantially a stream line flow.

It is a further object of this invention to provide a means of yieldable material to be associated with a standard tool joint to change the fluid passage from the abrupt changes of area to a passage having substantially a stream line flow.

A further object of this invention is to provide means to be associated with a standard tool joint which has a high resistance to erosion, and which means protects the tool joint against erosion.

Another object of this invention is to provide yieldable means in the tool joint fluid passage to change the passage from one having abrupt changes of area to one having a stream line shape.

A further object of this invention is to provide a tool joint provided with a stream line passage, each end of which is of substantially the same diameter as the internal diameter of the adjacent ends of the drill pipe.

Another object of this invention is to provide a tool joint member with fluid passages which at the end adjacent the drill pipe is flared gradually to substantially the same diameter as the internal end of said drill pipe.

It is a further object of this invention to provide the members of a tool joint with a fluid passage whereby the fluid passage from one member is in line and of substantially the same diameter as the fluid passage of the other member.

A further object of this invention is to provide the members of a tool joint with a stream line fluid passage whereby the metal section of the tool joint is materially strengthened.

In the drawing:

Figure 1 is a sectional view of a standard tool joint showing a section of drill pipe attached to each end thereof.

Figure 2 is a similar view to Figure 1 showing the stream passage formed by applying the thimbles of this invention thereto.

In the drawing a standard tool joint is represented at 1 having a pin member 2 and a box member 3. The pin member is provided with a tapered pin section 4 having a suitable tapered external thread thereon. The box section 3 is provided with an internally threaded tapered section 5. The threaded sections 4 and 5 are adapted to be screw threaded together to form a connection between the members 2 and 3. Each tool joint member is provided with an internally threaded section 6 into which the threaded end of the drill pipe 7 is screw threaded.

The pin member 2 is provided with a circulating fluid passage 8 which communicates with the internally threaded portion 6. The member 3 is provided with a fluid passage 9 in communication with a fluid passage 8 and the internally threaded portion 6. The drill pipe is provided with a fluid passage 10 having a discharge end 11 communicating with the internally threaded section 6 of each of the tool joint members. It will be noted that the discharge passage 11 discharges abruptly into the internally threaded portion 6 of each member. The circulating fluid which usually flows in the direction of the arrow A discharges from the openings 11 into the enlarged section 6 of the pin member 2 and from the enlarged section 6 flows through the fluid passage 8 which, due to the tapered pin section 4, is of considerably smaller diameter than the internally threaded portion 6.

Due to the abrupt changes of area from the discharge opening 11 to the portion 6 and then to the passage 8, a violent turbulence is set up in the circulating fluid within the section 6, thus causing erosion of the tool joint and loss in head of the fluid passing through this portion of the tool joint member. The circulating fluid on leaving the passage 8 of the pin member discharges into the enlarged passage 9 of the tool joint member 3 from which the fluid discharges into the further enlarged section 6 and then enters the smaller opening of the drill pipe 11 and thus, the space from the discharge end of the passage 8 to the entrance 11 of the drill pipe 7 is second area of violent turbulence, causing further loss of head or pressure of the circulating fluid and also erosion.

To eliminate the violent turbulence in the section 6 of the pin member 2 there is provided a thimble 12 having a passage 13 with the end adjacent the drill pipe 7 of substantially the same diameter as the opening 11 of the drill pipe, and from this point converges to substantially the same diameter as the bore 8, and thus forming a stream line passage from the end 11 of the drill pipe 7 to the passage 8 of the pin member 2.

Positioned within the bore of the box member 3 is a thimble 14, one end of which is adjacent the pin end of the member 2 and the other end being adjacent the end of the drill pipe 7. The thimble 14 is provided with a fluid passage 15 which at the end adjacent the member 2 is of substantially the same diameter as the passage 8 and diverges to substantially the same diameter as the opening 11 of the adjacent end of the drilling pipe 7.

It will be seen that by providing the thimbles 12 and 14 that the abrupt changes in area of the fluid passage through the tool joint have been eliminated, and a stream line passage is provided from one drill pipe to the other, and also the internally threaded portion 6 is protected by the thimbles 12 and 14 whereby the flow of the circulating fluid through the tool joint is prevented from contacting directly with the threaded portions 6, and thus preventing erosion and weakening of this section of the tool joint. The thimbles 12 and 14 may be of any suitable material but in the preferred embodiment are made of rubber, which is highly resistant to abrasion of the mud and water circulating fluid.

A further advantage of making the thimbles of rubber resides in the yieldable character of the material, especially when the end of drill pipe contacts the thimble before a tight joint has been made between the drill pipe and tool joint member. In this case the rubber deflects to allow the drill pipe to be further screw threaded into the tool joint member until a tight joint is formed.

It is to be understood that in using the term "stream line" when referring to the fluid passage as meaning a passage gradually increasing in divergence or convergence, or a passage gradually increasing in cross sectional area to afford a gradual change of velocity from one diameter of bore to another bore so that the flow is smooth and turbulence avoided.

It is understood that the embodiment of the invention described herein is only one of the many embodiments this invention may take, and I do not wish to be limited in the practice of the invention, nor in the claims, to the particular embodiment set forth.

I claim:

1. A drill pipe joint member, means for securing a drill pipe thereto, a fluid passage through said member, and a thimble associated therewith having a passage which at one end is of substantially the same diameter as the discharge opening of said pipe, and converging gradually to the diameter of the passage through said member.

2. A drill pipe joint member having means for securing a drill pipe thereto, a fluid passage through said member and a rubber thimble associated therewith having a passage which at one end is of substantially the same diameter as the discharge opening of said pipe and converging gradually to the diameter of the passage through said member.

3. A drill pipe joint member having a fluid passage enlarged and internally threaded at one end to receive the threaded end of a drill pipe, and a rubber thimble positioned within said enlarged bore to protect said bore from erosion and to provide a stream-line passage from the drill pipe bore to said fluid passage.

4. A drill pipe joint member having a fluid passage enlarged and internally threaded at one end to receive the threaded end of a drill pipe, a thimble positioned within said enlarged bore to protect said bore from erosion and to provide a steam-line passage from the drill pipe bore to said fluid passage.

5. A drill pipe joint comprising, a pin member having a threaded portion and a fluid passage, a box member having an internally threaded portion adapted to receive the threaded portion of said pin member to form a fluid tight joint, and means for securing a drill pipe to one end thereof, and a rubber thimble mounted within said box member and having a passage of substantially the same diameter as said pin member passage and communicating therewith, and suitably diverging to substantially the same diameter as the opening at the adjacent end of said drill pipe and communicating therewith.

6. A drill pipe joint comprising, a pin member having a threaded portion and a fluid passage, a box member having an internally threaded portion adapted to receive the threaded portion of said pin member to form a fluid tight joint, and means for securing a drill pipe to one end thereof, and a thimble mounted within said box member and having a passage of substantially the same diameter as said pin member passage and communicating therewith, and suitably diverging to substantially the same diameter as the opening at the adjacent end of said drill pipe and communicating therewith.

7. In a tool joint, the combination of two sections of drill pipe, a pin member having means for securing one section of drill pipe to one end thereof and having an externally threaded pin and a passage therethrough, a tubular box member having means for securing the other section of drill pipe to one end thereof and having an internally threaded box arranged to have the threaded portion of said pin member screw threaded therein, and a thimble positioned within the passage of each of said members, and each thimble having a stream line passage communicating with the passage of said pin member and of substantially the same diameter, and diverging gradually to substantially the same diameter as the internal diameter of the adjacent ends of said drill pipe.

8. In a tool joint, the combination of a pin member having a fluid passage enlarged and internally screw threaded at one end to receive the threaded end of a drill pipe, a tubular box member having a central bore enlarged and internally screw threaded at one end to receive the threaded end of a second drill pipe, and means positioned within the enlarged bore of each member to provide a stream line passage from said bores to said fluid passage.

9. A drill pipe joint member having means for securing a drill pipe thereto, a fluid passage through said member and a thimble of material effective in resisting erosion associated therewith and having a passage which at one end is of substantially the same diameter as the discharge opening of said pipe and converging gradually to the diameter of the passage through said member.

10. A tool joint including, a box section having a longitudinal opening and a socket at each end of the opening, a pin section having a longitudinal opening and a pipe socket at its outer end, a pin on the inner end of the pin section screw-threaded into one of the sockets in the box section, the opening in the pin section being of less diameter than the opening in the box section so that the end of the pin forms a shoulder in the box section, and a tubular bushing held in the said socket between the shoulder and a pipe threaded into the socket, said bushing having a longitudinal opening in direct register with and of the same diameter as the longitudinal opening in the pin section.

ALADAR HOLLANDER.